(12) United States Patent
Hanks

(10) Patent No.: US 7,451,281 B2
(45) Date of Patent: Nov. 11, 2008

(54) SYSTEM AND METHOD FOR USING SWAPPABLE STORAGE FOR STORING PROGRAM DATA

(75) Inventor: D. Mitchel Hanks, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 890 days.

(21) Appl. No.: 10/455,187

(22) Filed: Jun. 5, 2003

(65) Prior Publication Data

US 2004/0250016 A1 Dec. 9, 2004

(51) Int. Cl.
G06F 12/00 (2006.01)
H04N 7/173 (2006.01)

(52) U.S. Cl. ............... 711/154; 711/112; 711/113; 711/117; 725/94; 725/145

(58) Field of Classification Search ............ 711/113, 711/112, 117, 154; 725/94, 145
See application file for complete search history.

(56) References Cited

U.S. PATENT DOCUMENTS

| | | | |
|---|---|---|---|
| 5,579,516 A | 11/1996 | Van Maren et al. | |
| 5,761,417 A * | 6/1998 | Henley et al. | 709/231 |
| 6,463,508 B1 * | 10/2002 | Wolf et al. | 711/133 |
| 6,542,967 B1 * | 4/2003 | Major | 711/134 |
| 2003/0051101 A1 * | 3/2003 | Burger et al. | 711/137 |
| 2003/0081942 A1 * | 5/2003 | Melnyk et al. | 386/125 |
| 2004/0040039 A1 * | 2/2004 | Bernier | 725/46 |
| 2004/0187160 A1 * | 9/2004 | Cook et al. | 725/94 |
| 2004/0268400 A1 * | 12/2004 | Barde et al. | 725/94 |

FOREIGN PATENT DOCUMENTS

| | | |
|---|---|---|
| EP | 0 777 228 | 6/1997 |
| EP | 0777228 * | 6/1997 |
| GB | 2 253 726 | 9/1992 |
| GB | 2 295 481 | 5/1996 |

OTHER PUBLICATIONS

"Microsoft Computer Dictionary," Fifth Edition, Microsoft Press, 2002, pp. 165.*
Foreign Search Report issued for GB0411558.0, dated Sep. 16, 2004.
U.S. Appl. No. 10/455,651, D. Mitchel Hanks.

* cited by examiner

*Primary Examiner*—Matthew Kim
*Assistant Examiner*—Shane M Thomas

(57) ABSTRACT

One embodiment provides a method of providing a user with information quicker than could be achieved by obtaining the information from a storage source, the method comprising receiving a request from a user for stored data accessible by the user, the stored data maintained on one or more disks accessible one at a time and wherein the disks have a latency between the time of the request and the time the information is actually available, and obtaining a first portion of the requested data from a source other than where the requested data is stored, the amount of the first portion spanning the latency period.

10 Claims, 9 Drawing Sheets

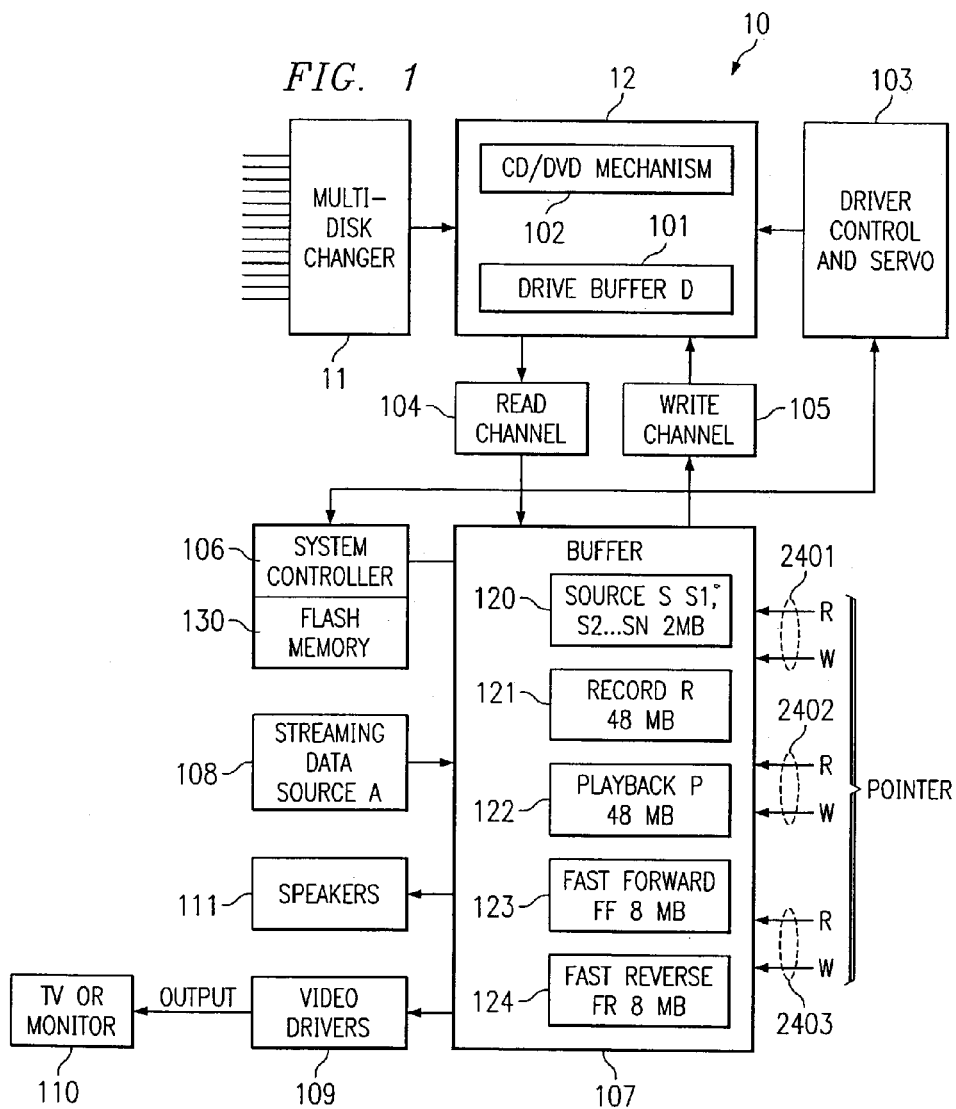

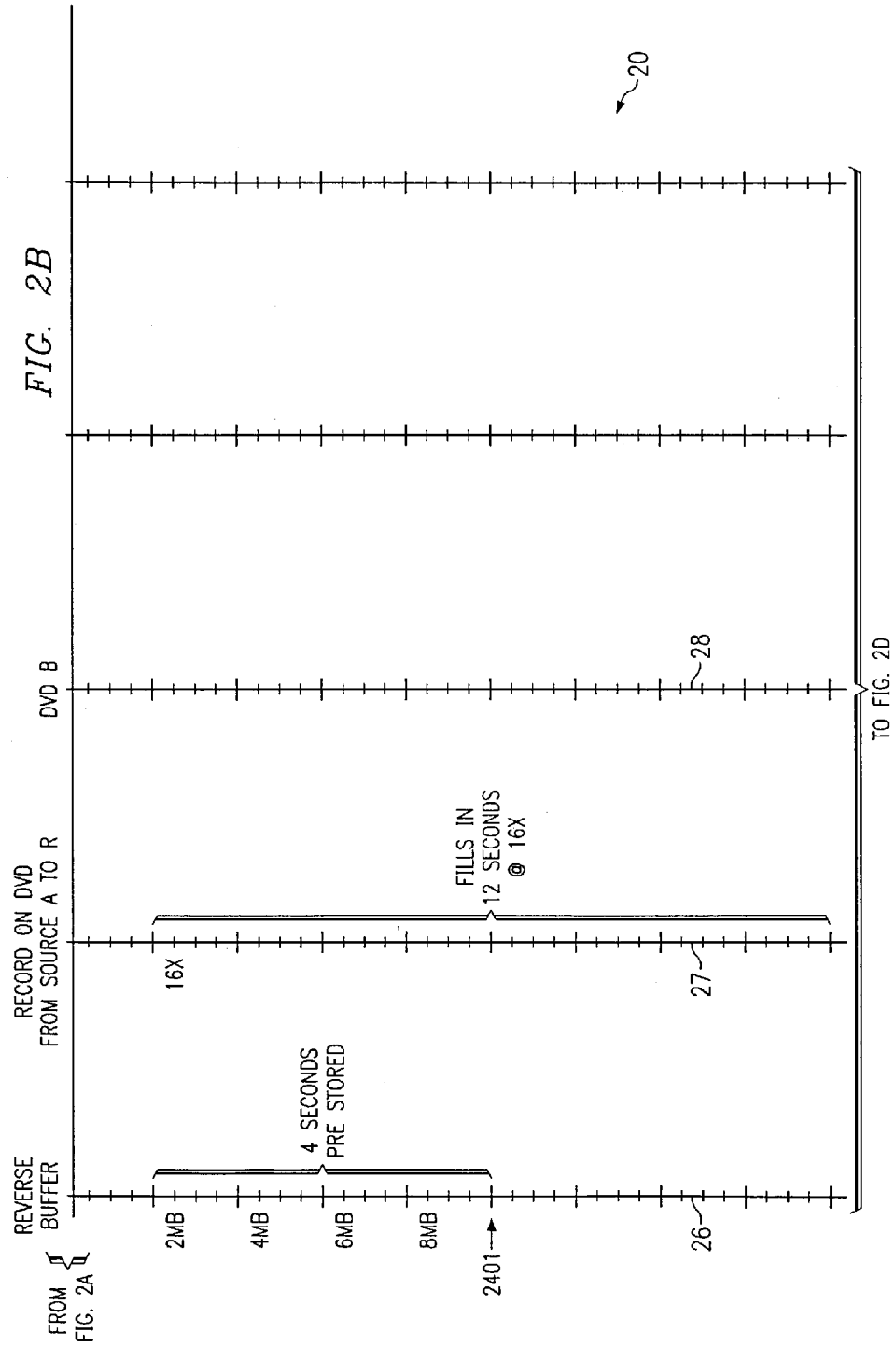

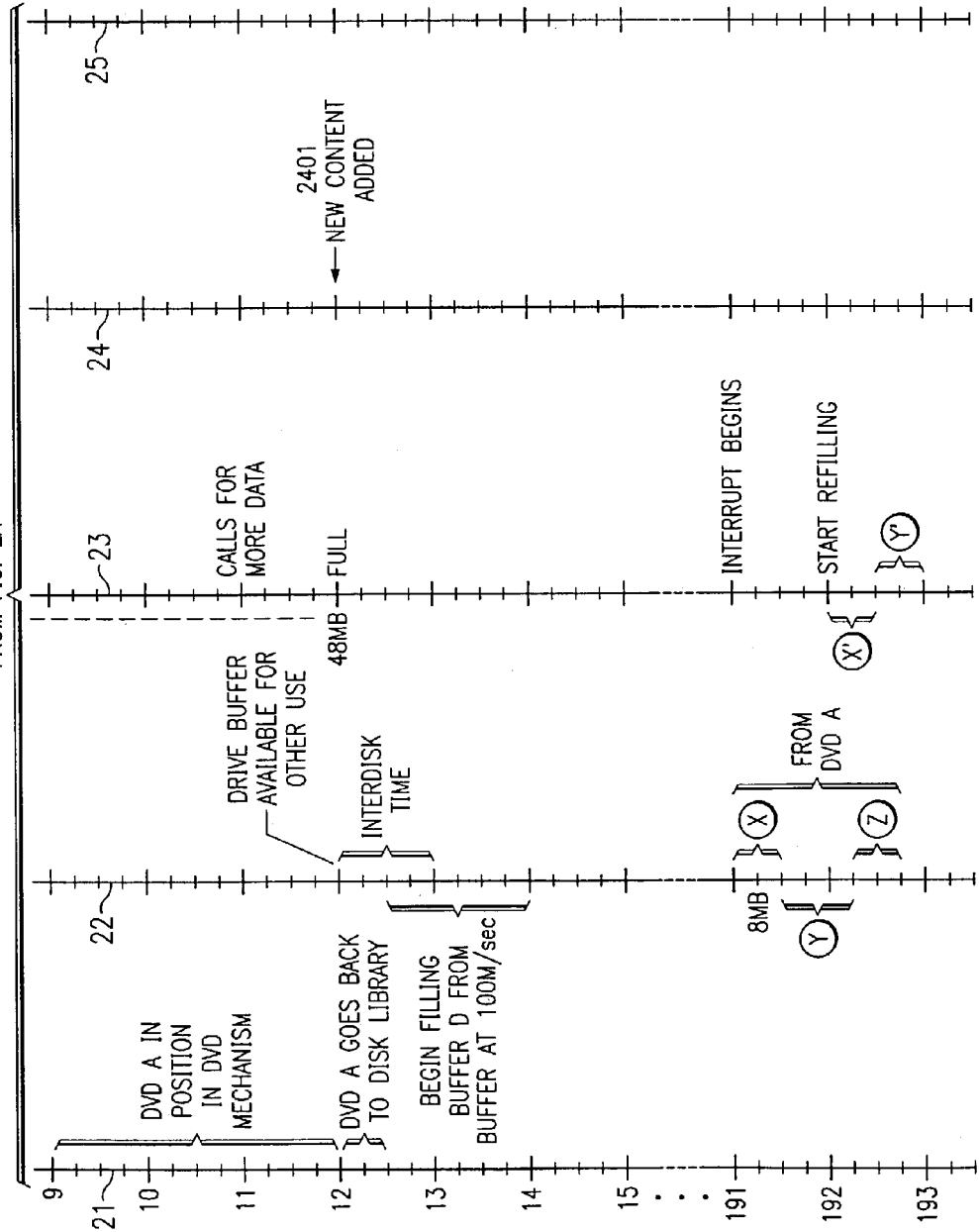

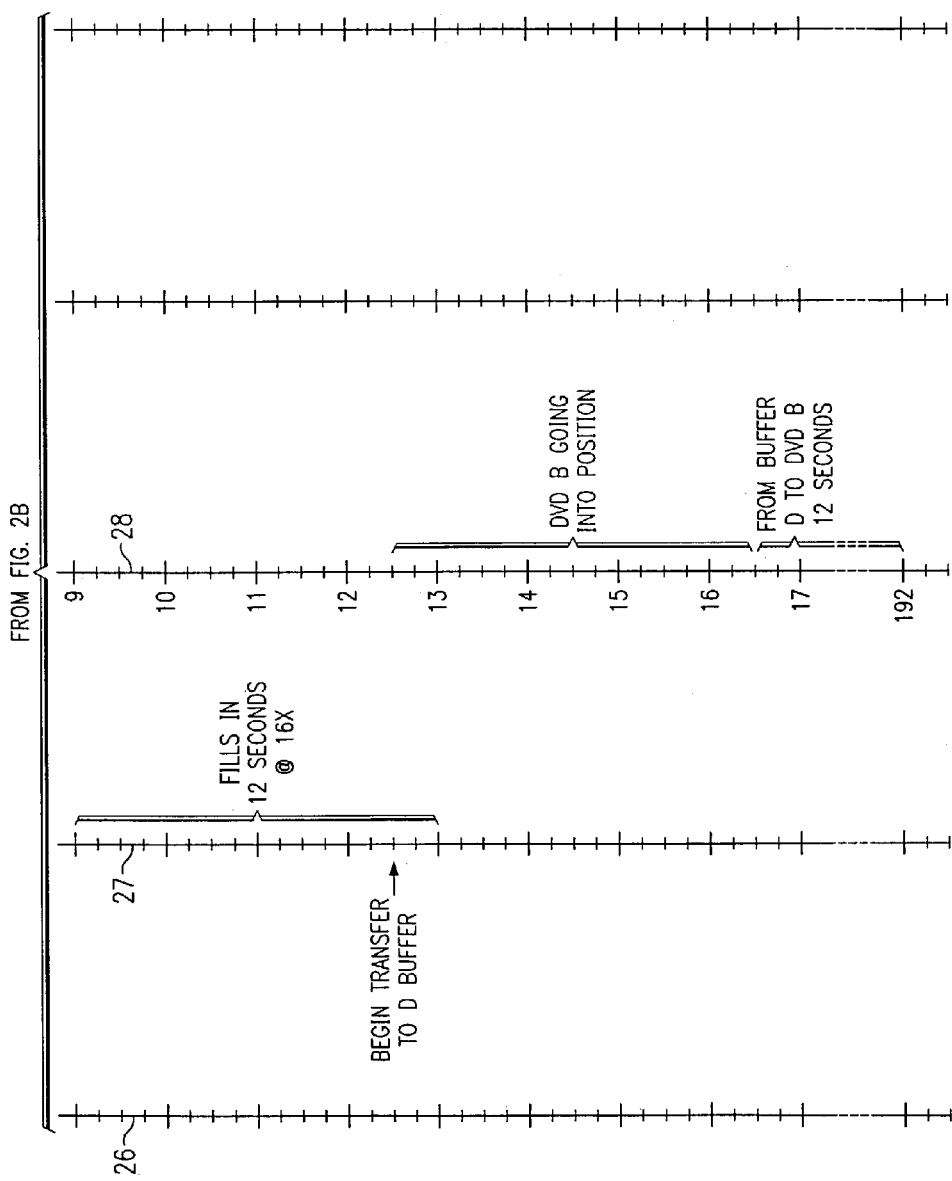

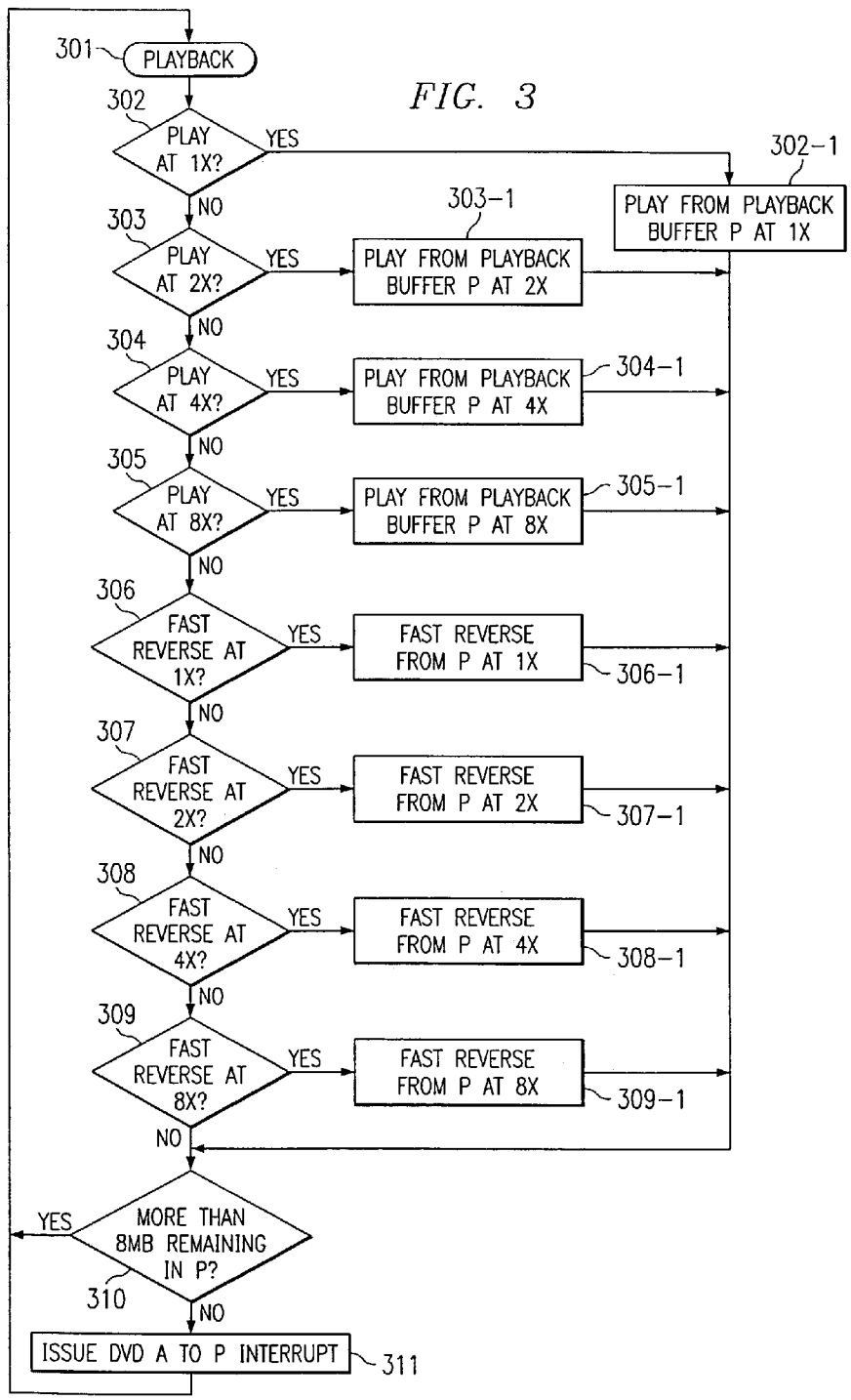

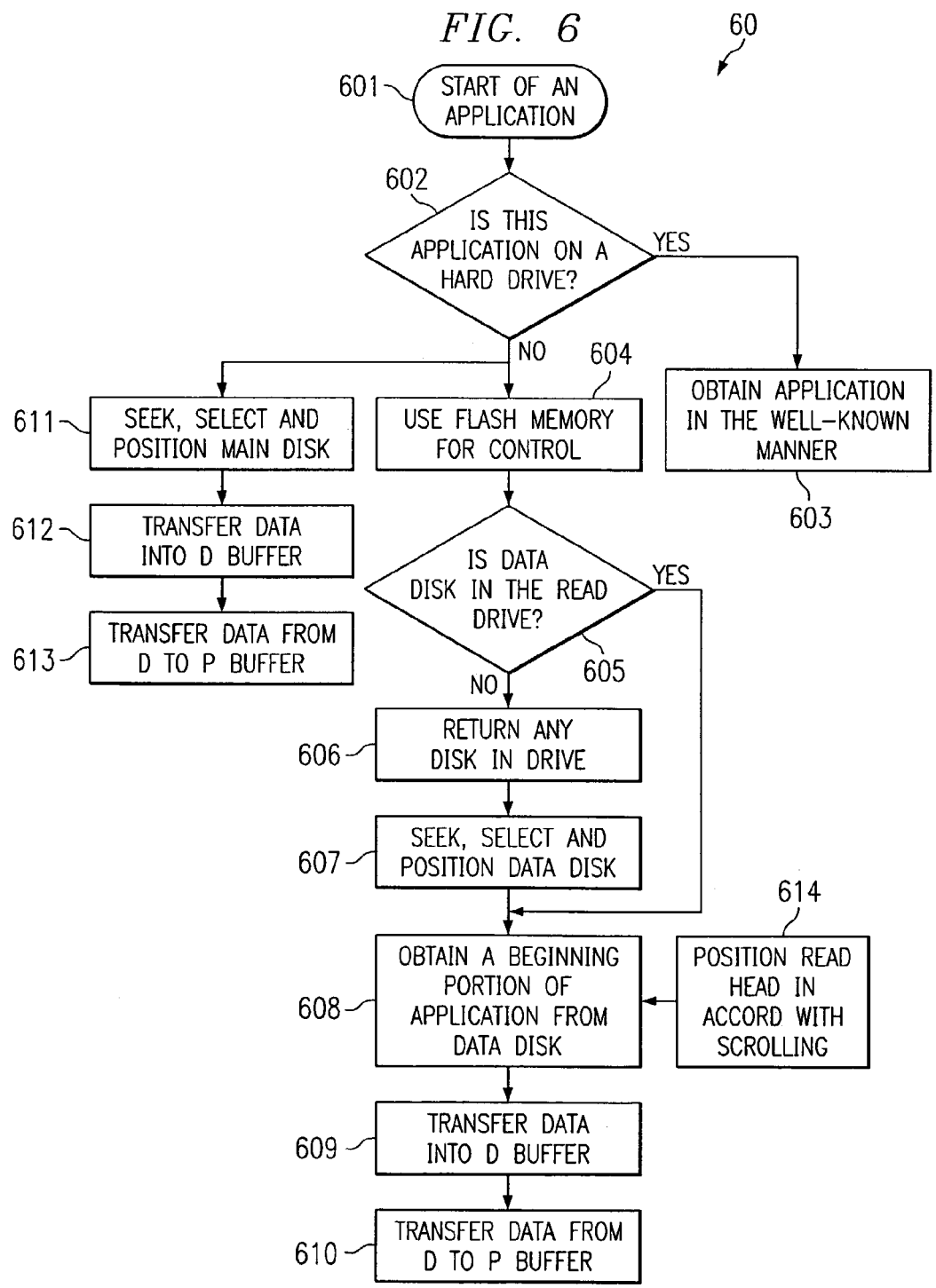

SYSTEM AND METHOD FOR USING SWAPPABLE STORAGE FOR STORING PROGRAM DATA

CROSS-REFERENCE TO RELATED APPLICATIONS

This application is related to concurrently filed and commonly assigned U.S. patent application Ser. No. 10/455,651, entitled "SYSTEM AND METHOD FOR USING SWAPPABLE STORAGE FOR HIGH DATA CONTENT MULTI-SOURCE DATA STORAGE," the disclosure of which is hereby incorporated herein by reference.

FIELD OF THE INVENTION

This invention relates to data storage techniques and more particularly to a system and method for using swappable storage for storing program data.

DESCRIPTION OF RELATED ART

It is now possible to stream high data content files to and from swappable storage devices, such as digital versatile disks (DVDs), compact disks (CDs), memory cards, and the like. Typically, this information is processed from the swappable storage device into a computer hard drive and/or computer based temporary memory and from the hard drive (or other storage area) to a screen or screens, speakers, or to other devices, such as external memory.

Users may desire to receive data from more than one such swappable storage input, sometimes simultaneously. Sometimes the data stored on such swappable devices are programs which are desired to be used by a user having access to a computer.

This presents a problem when the storage device being used is not physically connected to the processor, or when the processor can only send or receive data from one of these devices at a time. This is unlike the situation where the data is stored in a permanently accessible storage device, such as a hard drive on a computer, where data can be stored at and retrieved from any location in the hard drive in a random access manner. However, in some situations, storage internal to a system, such as, for example, a hard drive, may not be available.

If data is stored on swappable devices, such as, for example, CDs or DVDs, such data is not available until the system locates the storage device, physically connects to it, and then reads the desired information from the newly-connected storage device. This operation typically takes a finite amount of time. When the user desires to use an application program, or other data, which is stored on a swappable device, latency problems occur. Users who become accustomed to perceived instantaneous responses could be dissatisfied if they experience delay times because of the seek-and-access time required for swappable storage devices.

BRIEF SUMMARY OF THE INVENTION

One embodiment provides a method of providing a user with information quicker than could be achieved by obtaining the information from a storage source, the method comprising receiving a request from a user for stored data accessible by the user, the stored data maintained on one or more disks accessible one at a time and wherein the disks have a latency between the time of the request and the time the information is actually available, and obtaining a first portion of the requested data from a source other than where the requested data is stored, the amount of the first portion spanning the latency period.

Other embodiments provide a system for retrieving data, comprising a first storage source having a latency between a time when a request for data on the first storage source is received and a time when the first storage source is physically available for the retrieval of data therefore, and a second storage source physically separate from the first storage source for maintaining therein a first portion of data requestable by the user. Still other embodiments provide a data retrieval system, having a storage library capable of holding a plurality of individually accessible storage media; a media drive operable for reading data from a selected one of the storage media contained in the library, the drive having a latency between the identity of required data and the time the identified data is actually available, at least one buffer for accepting data from a storage media positioned in the media drive, the data accepted faster than it is utilized, thereby creating media drive idle periods; wherein the media drive is operable for delivering to a user at least one program during the idle periods; and wherein a first portion of the delivered portion comes from a storage media other than the storage media on which said at least one program resides.

Still other embodiments provide a device for providing program information for controlling a system, the device comprising means for obtaining requests for a stored program accessible to the system, the stored program maintained in a location having a latency between the time of the request and the time the program is actually available for use by the system, and means for obtaining a first portion of the requested program from a source location other than where the requested program is stored, the amount of the first portion spanning the latency period.

BRIEF DESCRIPTION OF THE DRAWINGS

FIG. 1 is a block diagram of one embodiment of the invention;

FIG. 2 shows how FIGS. 2A-2D are to be arranged;

FIGS. 2A-2D show a number of timelines illustrating the timing for moving data to/from a storage media according to an embodiment of the invention;

FIG. 3 shows a playback flow chart for one embodiment of the invention;

FIG. 6 is a fast-data access flow chart for one embodiment of the invention.

DETAILED DESCRIPTION

Figure 2A:
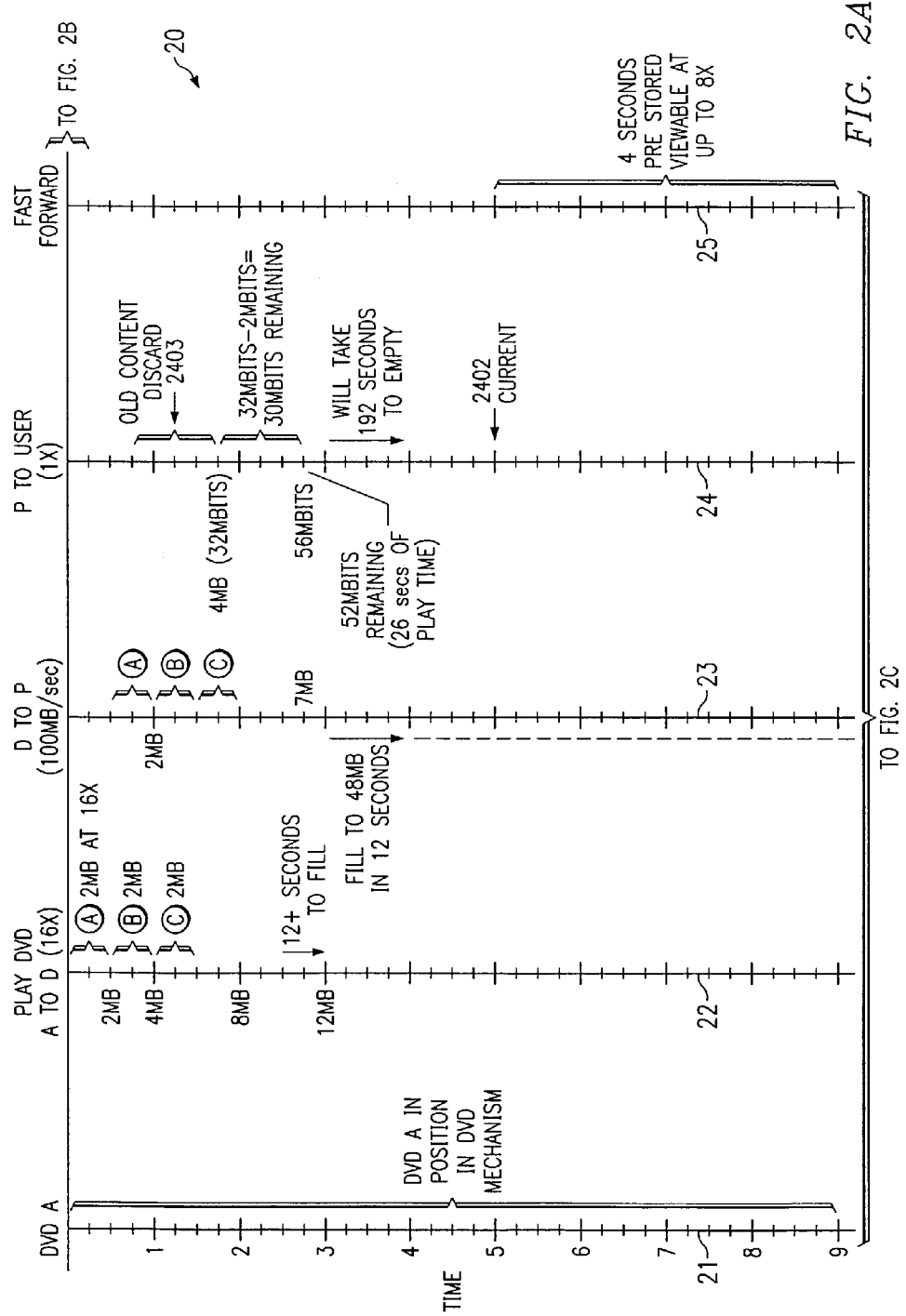

A user's desire to concurrently process data to/from different storage media, where the storage media are alternately available to the user, is met by arranging a first buffer to accept data from a selected first one of the storage media and arranging a second buffer to accept data destined to be recorded on a second one of the storage media. The first buffer is loaded from the first media faster than the data is processed by the user, hereby generating slack periods of time where data is not being loaded into the first buffer. During the slack periods, data from the second buffer can be transferred to the second media without perceptible delay.

A user is provided with data quicker than could be achieved by obtaining the data from the main storage source, where the data is maintained. This result is achieved by obtaining a first portion of the requested data from a source other than where the requested data is stored, with the amount of the first portion spanning the latency gap that would occur if the user had to wait for retrieval from the main storage source.

FIG. 1 shows an overall view of system 10, according to an embodiment of the present invention, which includes buffers 107 for controlling information in and out of the various data sources and destinations. High volume data, such as compressed video data from data source A 108, can flow into system 10 as will be described. Such information can be provided to, for example TV or monitor 110, via video drivers 109, and/or speakers 111. Alternatively, the data from source A can be provided for recording on a CD, DVD, or other media via drive 12 controlled by driver control and servo system 103.

Drive 12 may contain, for example, CD/DVD mechanism 102 and drive buffer 101. System controller 106 preferably controls the information in and out of the buffers and controls driver control and servo 103. CD/DVD mechanism 102, in the embodiment shown, is in physical communication with multi-disk library changer 11 so that several DVDs and CDs can be maintained and provided to/from the CD/DVD mechanism on demand.

Typically drive 12 would have drive buffer 101 built into the mechanism. However, drive buffer 101 could be located external to drive 12 if desired. Drive buffer 101 may be fed for recording by write channel 105 from buffers 107. Drive buffer 101 may feed read channel 104 to buffer 107.

Buffer 107 of the illustrated embodiment comprises source buffer 120, record buffer (R) 121, playback buffer (P) 122, fast forward buffer (FF) 123 and fast reverse buffer (FR) 124. In one embodiment, source buffer 120 may comprise several buffers, e.g., S1 through SN. Each such source buffer, in the illustrated embodiment, has a capacity of 2 megabytes although other capacities are possible according to the present invention. Although shown as single buffers, it should be appreciated that any or all of record buffer 121, playback buffer 122, fast forward buffer 123, and fast reverse buffer 124 may comprise a plurality of buffers, if desired, or they all may be arranged as a single buffer with pointer for the various sub-sections of the common buffer. In the illustrated embodiment, record buffer 121 and playback buffer 122 are each 48 megabytes, while fast forward and fast reverse buffers, 123, 124, respectively, are 8 megabytes each. These capacities can be adjusted as desired. Such adjustment of buffer size may depend, for example, on cycle times for drive 12, and speed of data transfer, memory cost and memory size availability. In one embodiment, fast forward buffer 123 and fast reverse buffer 124 are part of playback buffer 122.

One typical operation for system 10 would be to receive video data from source A 108 and then record that data on a disk in drive 12. At the same time, it might be desired to play a CD or DVD from multi disk changer library 11 to TV 110. However, in the illustrated embodiment there is a single CD/DVD drive 12, and this drive may, at some periods of time, be called upon to record on one disk while at the same apparent time (as perceived by a user) as being called upon to play data from a different disk. To accomplish this scenario, buffers 107 of the present invention are used to buffer information coming from and going to drive 12 so that the user perceives the data to be a continuous flow. In reality, the physical situation is that drive 12 is being timeshared between two or more different CD/DVDs, or other media, to accommodate both read (playback) and/or write (record) situations on different disks. It being appreciated that embodiments of the invention may provide for various combinations of simultaneous reading and writing to different media, including the aforementioned read/write situations as well as read/read and write/write situations. Of course, while different physical recording media are contemplated (one for recording, one for playback), a user may desire to use the same CD or DVD for both functions.

A further problem exists when the user decides to fast forward to view something ahead or fast reverses to view something that the user has already seen. In one embodiment, as will be discussed hereinafter, fast forward and fast reverse is accomplished at 8X, X being a data rate for streaming the data in a manner such that if displayed on a monitor the images are properly perceived by the viewer. In the illustrated embodiment, video data streaming data rate is 2 megabits per second. This is a rate at which a viewer is able to perceive the data on a TV or monitor so that the data appears normal to the user. The 8X rate allows the viewer to see the data eight times faster on the monitor. This is accomplished, for example, by displaying every $8^{th}$ frame of data. The X data rate is for discussion purposes herein and (as above-discussed) is 2 megabits per second. It will also be assumed that there are 8 bits to a byte. Of course, data rates other than 2 megabits per second and fast forward and/or fast reverse rates other than 8X, as specifically mentioned herein, may be utilized according to the present invention.

Turning now to FIGS. 2A-2D (arranged according to FIG. 2), there is shown timing chart 20 which contains thereon several vertical lines 21-28, each broken into time segments. For the purposes of illustration, the segments chosen are one second intervals. These intervals can be any desired number depending upon data rates, and buffer sizes. The size of the intervals is matched to a disk swap out time and the number of permissible cycles for a particular changer so as not to over utilize the changer mechanism.

Timeline 21 assumes that DVD A is in DVD mechanism 102 (FIG. 1). Starting at time zero, according to the illustrated embodiment information will transfer from DVD A to drive buffer D 101 (FIG. 1) at a 16X (32 megabits/seconds) data transfer rate. Thus, as shown in timeline 22, at the end of 1 second, buffer D will have in it 32 megabits or 4 megabytes (MB) transferred, 2 MB at a time. In operation, data from DVD A is streamed into drive buffer D 101, 2 MB at a time, and transferred, via read channel 104 (FIG. 1), to 48 MB play-back buffer P 122 (FIG. 1).

There is a slight transfer time, roughly one per second 100 megabytes, between buffer D and buffer P for each two megabytes of transferred information. This transfer time has been ignored for simplicity of illustration. Thus, as shown on timeline 23, starting at the one-half second point (arbitrarily selected), the first two megabytes of information A from buffer D is transferred to the P buffer. This transfer preferably continues until buffer P is filled, e.g., 48 MB of data are moved into playback buffer P. If there are no interruptions, this will continue until playback buffer P is full at the 12 second point, as shown on timeline 23.

Any time after the information begins to transfer into buffer P, it can begin to be streamed out of buffer P to the user at the X rate, e.g. 2 megabits per second, as shown on timeline 24 starting at the ¾s of a second mark (arbitrarily selected). Because the information is streaming out of buffer P at the X rate, it will take approximately 192 seconds to empty play-back buffer P. Thus, between the 12 second point and approximately the 190 second point, drive buffer D (as shown on timeline 21) becomes available for other purposes.

For example if the user, or another user, also now wanted to record video from another source, such as source A 108 (FIG. 1) onto DVD B, the system could do so. Thus, as shown on timeline 21, at the 12 second interval DVD A goes back into library 11 (FIG. 1). At approximately the 16 second interval, as shown on timeline 28 (FIG. 2D), DVD B goes into position on drive 12.

As shown on timeline 27 (FIG. 2B), the user could have started bringing in video data, for example from source A, at any time.

In our example, such data is shown coming into record buffer R 121 (FIG. 1) at the 1 second interval. This data comes in at the 1X rate. Thus, it would take nearly 192 seconds to entirely fill the 48 MB R buffer. At any time after second 1, buffer R would be available to begin sending data to drive 12 for recording on DVD B at the 16X rate. 192 seconds would pass before the record buffer is completely filled. Since it will only require 12 seconds to deplete, data transfer can start at any time within the 192 seconds, preferably when the buffer is nearly full, thus leaving large periods of slack time for other data streams.

Note that while the transfer from DVD A to DVD B occurred in our example, at the 12 second interval, this could occur at any time between 12 seconds and approximately 191 seconds. Also, while the example has focused on two DVDs, certainly the same principles can apply to several, DVDs, CDs, or other storage devices and/or media. Also note, that recording could be any type of data, such as video data, while the playback could also be any type of data, such as audio data.

Timeline 24 (FIG. 2A) shows pointer 2402 marking the position along the timeline where data currently is being removed. In our example, this pointer is at the five second interval, meaning that the user has viewed or used five seconds of data from the P buffer at the 1X streaming rate. The system, if desired, has fast forward buffer FF, shown on timeline 25, which always has in it 8 MB of data ahead of pointer 2402. This data is viewable at the 8X rate, such that every $8^{th}$ frame is shown to a viewer so that the viewer would effectively have a fast view of the information much the same as would be seen if the view fast forwarded a video tape. The 8 MB fast forward (FF), buffer of the illustrated embodiment, allows four seconds of viewing before being updated.

Also, based upon the position of present pointer 2402, there would be a fast reverse buffer (FR) of the last 8 MB of data (shown as timeline 26, FIG. 2B), again giving the viewer four seconds of data backwards at the 8X rate. This information is effectively transferred from the P buffer to the FF or FR buffers on a circulating basis. Note that if the user were to desire to fast forward beyond the capability of the P buffer to supply data, then it would be incumbent on the system to obtain that data from the DVD, or other source, while still allowing for the interchangeability between disks. This may be addressed by maintaining the recirculation FF or FR buffers full with 8 MB of data.

As discussed, the size of the buffer allotted to fast forward and fast reverse is a balance of performance and cost. The content is preferably circularly buffered, meaning that the oldest content would be continually discarded while the newest would be continually added. In one example, three memory pointers (2401, 2402 and 2403) are employed, one each for the new content addition address (2401), one for the current viewpoint address (2402), and for the old content discard address (2403).

In the example being discussed, the system would try to always maintain the new content address to point 8 MB ahead of the current viewpoint address and the old content address would be kept 8 MB behind the current viewpoint address, thus maintaining the fast forward and fast reverse buffers, respectively. Depending on the overhead required, it may be possible to use a single pointer for the new content addition and the old content discard address. Assuming a 16X read speed by the DVD drive, when play is first enabled buffer D would begin filling reverse buffer FR at 16X, while buffer FR is playing back at the X rate as discussed above. This would be enough to accommodate the disk change access time should a user decide to fast forward or fast reverse.

When the user pushes fast forward, data is read from FF buffer at 8X. If the fast forward command comes just after the system had switched out the record disk for the playback disk, the fast forward buffer would be fed mainly from the DVD drive itself at 16X, while the buffer was being emptied to the user at 8X. Fast forward could continue for the 2 minutes that the record disk is being serviced, since the drive continues to feed the buffer and the playback at a sufficient rate to avoid buffer depletion.

If the fast forward command came right after the playback disk had been swapped out and the recording disk swapped in, the record buffer would be nearly full so the buffer would need to write to the drive at 16X to deplete the record buffer as quickly as possible. At this rate the record buffer would be depleted in 12 seconds after which the system could switch back to the playback disk to re-fill the playback buffer and continue to support fast streaming of the playback data. At 8X, the read buffer would be able to sustain fast forward without the disk for 28 seconds before the disk was needed again to fill the empty buffer. That would allow around 16 seconds after the time the record buffer had been depleted and when the playback disk had to begin streaming data to the play buffer again. Scenarios where the fast forward button was pushed between these extremes would be a combination of the above. There would likely be a need to partially empty the record buffer before switching back to the play disk and/or partially filling the read buffer before switching back to the record disk.

For fast reverse, because the drive cannot spin backwards the data may be pulled off in chunks, between which a seek to an increasingly inward (earlier in content time because it is being viewed in reverse) radius is necessary. For this reason, some systems may desire to have a longer fast reverse buffer than fast forward buffer. A typical scenario for fast reverse would be similar to the fast forward system discussed above, except that the data being retrieved from the disk would not be played until the read for the segment was complete, since the last block read from the disk (closer to the center of the disk, thus earlier in reverse content time), would be the first block played to a user.

When the fast reverse command arrives from one user, the 8 MB fast reverse buffer would begin playing at an increased rate, say 8X, in reverse order as shown on timeline 26 at point 2401. As soon as the drive was ready to switch to the playback disk, the drive would seek to a point 128 seconds earlier in the content than the earliest time point currently in the buffered content. The drive would buffer from this point 128 seconds forward into buffer P, which then replenishes the fast reverse buffer 8 MB at a time. It takes 8 seconds to read 128 content seconds worth of data at 16X. This data is being played out to the user at 8X, so the buffers will empty in 4 seconds. The drive could then take 3.5 seconds to switch back to the record disk to service the record stream, during which time it would deplete (by storing on a DVD) the contents of the record buffer at 16X. The system may deplete 16 seconds of data from buffer R to avoid buffer overrun. This will take 1 second, after which it could take 3.5 seconds to re-load the playback disk. By repeating this sequence, an 8X fast reverse could be sustained while continuing to record content incoming at X.

The above description assumed the worst case where the record and playback locations were on different disks, requiring a disk change between every cycle. If the record and playback locations are on the same disk, the same basic principles would apply, except that much less buffer space would be required, since the access times were much quicker.

Turning now to FIG. 3, there is shown one embodiment of a flow chart outlining the playback method as discussed with respect to FIGS. 2A-2D above. Starting with Process 301, there are four other processes 302, 303, 304 and 305 with their respective controls 302-1, 303-1, 304-1 and 305-1, which control the playback P buffer at the various possible speeds. The play speed X was discussed above with respect to timeline 24, while the fast forward playback at 8X, process 305, was discussed with respect to timeline 25. However, the user may select other playback speeds, such as 2X, 4X, or any other desirable playback speed and these would operate in the same manner as discussed, except that for those playback speeds slower than 8X. The swap out of a disk being recorded at the same time would be even less severe. Similarly, fast reverse process 306, 307, 308 and 309 with their respective controls 306-1, 307-1, 308-1 and 309-1 could be handled. Fast reverse at 8X, process 309, was discussed in detail with respect to timeline 26. Reverse can be X, 2X, 4X, or any other desirable speed, it being appreciated that fast reverse speeds of less than 8X would cause less stress to the system.

As long as there are more than 8 megabytes remaining in the P buffer, process 310, the system can continue to take the reverse or playback from playback buffer P. However, when buffer P has less than 8 megabytes remaining, there is preferably an interrupt issued to the system, process 311, so that the proper disk can be installed in the drive to continue the refill of the P buffer in the manner discussed.

Figure 4:
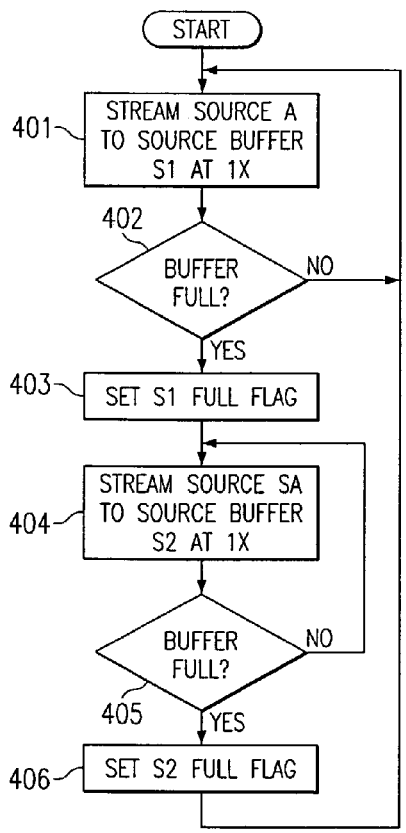
FIG. 4 shows a record flow chart for one embodiment of the invention.

FIG. 4 shows the control of the record function, such that data streaming from source A would go into source buffer S1 under process 401 control. This is shown in timeline 27. This continues until the buffer is full, process 402. If the source buffer is divided into sections, such as the 2-megabyte buffer S1 through SN sections, then the system could set flags S1 through SN as desired via process 403 and the source A would stream data to the source buffers S1 through SN via process 404. This streaming can continue until the source buffer or any section thereof is full. Process 405 triggers the system to set a flag via process 406, indicating that the source buffer is full.

Figure 4A:
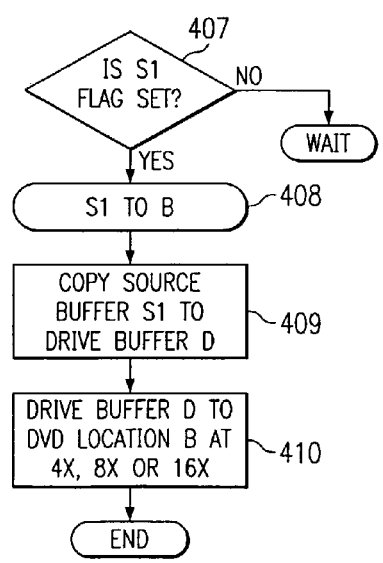
FIG. 4A shows a playback flow for one embodiment of the invention.

When it is time to record, as shown in FIG. 4A, the source buffers are played to DVD B as discussed with respect to timeline 28. This operation is controlled by process 407, 408, 409, and 410 for source S1. A similar process (not shown) controls source S2 in the same manner as S1. These buffers "Ping-Pong" between each other with careful buffer management to insure old data is not prematurely overwritten. According to embodiments of the invention, a single circular buffer could be used. Process 408 being the source buffer to medium transfer where process 409 copies the source buffer to the drive buffer and process 410 records the data from the drive buffer to the proper DVD (or CD) location.

Figure 5:
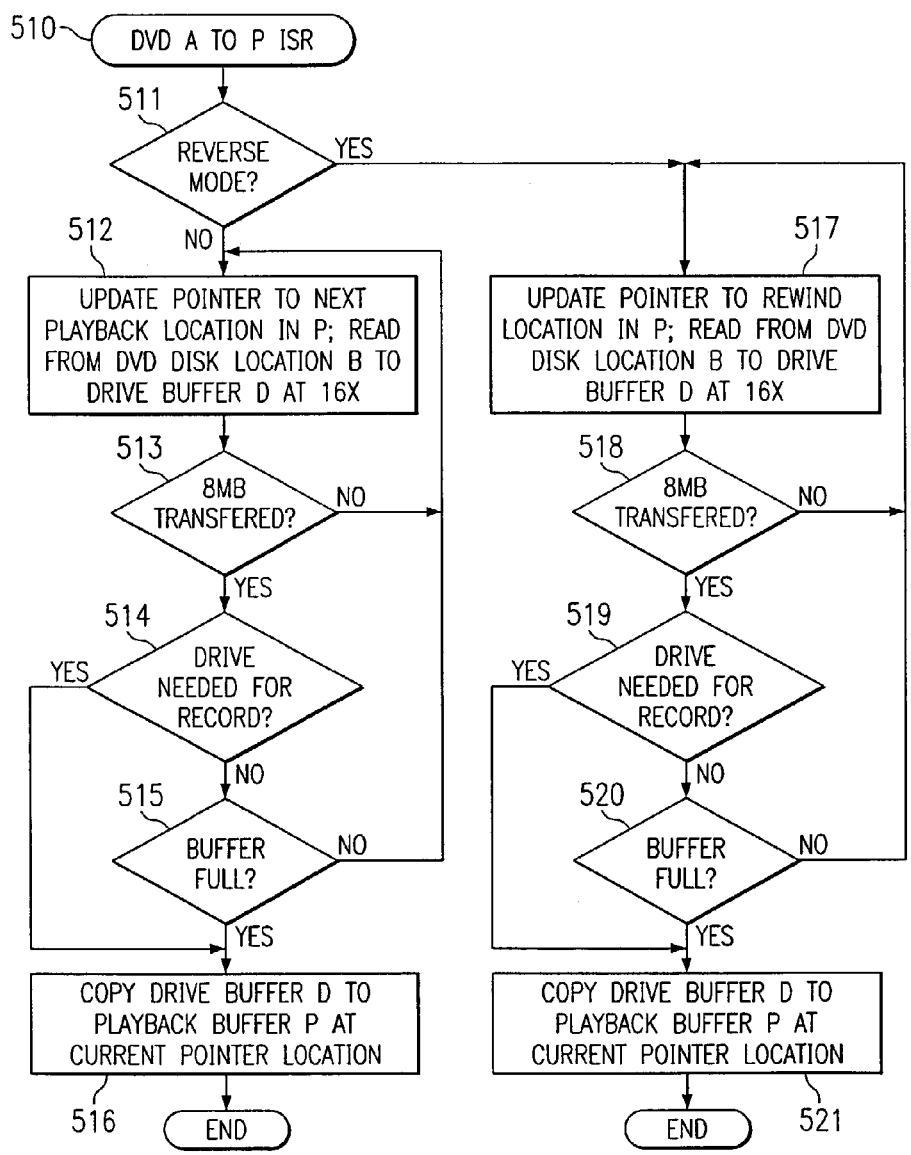
FIG. 5 is a buffer-full flow chart for one embodiment of the invention.

FIG. 5 shows interrupt service routine (ISR) 510 which is employed when one of the buffers, either on record or on playback, is in need of servicing by the DVD drive. In such a case, DVD A process 511 determines if this is a reverse mode. If not, then pointers are updated to the next playback location in P via process 512. The DVD is read and the information is transferred and a check is made to see if 8 megabytes have been transferred via processes 512 and 513. If the drive is not needed, process 514, then the buffers continue to fill via process 515, as discussed above, for 12 seconds as shown in timeline 22. If the drive is needed, for example if the record buffer is full and it is time to record, process 516 marks the location and P buffer where data has been stopped, and disk A is removed and disk B is inserted on the drive.

If the interrupt, via process 511 was for the purpose of reverse, then process 517, 518, 519, 520 and 521 control, such that, as discussed above, it is always desired to keep at least 8 megabytes of information in the reverse buffer. This continues so long as the drive is not needed for recording. If it is needed for recording, then the record interrupt operates, as discussed above, so that data is allowed to flow from the record buffer to DVD B while fast forward or fast reverse is being used and the buffer being depleted.

FIG. 6 addresses the issue of accessing any program content with hard disk access speed (without use of a hard disk, or other fast access memory). In the embodiment shown in FIG. 6, the system 60 would make use of a disk stored in changer 11 that would serve as a database manager for the entire system. This database disk would hold a first portion, for example, 32 seconds, of each recorded program (music, video, applications), preferably along with other system information. Each of these segments, may, for example, take up 8 MB of space on the database disk. There would then be room for around 587 recorded programs, which is roughly equivalent to more than 59 DVD+RW disks. This number is expected to be a number that would suffice for most users. The number of recordings could be reduced (or added to) and the length of the segment on the database disk increased (decreased) to optimize the system.

In this arrangement, non-volatile online memory, such as flash memory, 130 (FIG. 1) could be used to store the menu and/or directory structures, giving an instantaneous response to a user's command to obtain data from a source having a high latency. As shown in FIG. 6, if the menu button, process 601, were pressed and the desired application or data was in a hard drive, 602, the system would proceed in the well-known manner via process 603. If however, the desired data is on a disk (or other high latency memory) a determination would be made, process 604-605, to determine if the master data disk holding the short segments of all applications, is in the read drive, where it would be, except if another disk is currently being used. A fast-access, non-volatile memory, such as flash memory 130, for example, may control this function.

If a disk, other than the master data disk, were to be in the drive, using a simultaneous record/playback scheme, such as the one described above, the current disk in the mechanism 102 (assuming it is not the data disk) would be filed away, process 606, in changer 11 and the desired database disk would be retrieved, process 607, from changer 11 and inserted into mechanism 102. If the database disk is in the DVD drive and if there is no simultaneous recording going on, the database disk, would simply remain in the drive and the beginning portion via process 608, would be transferred to the D buffer, process 609, and from the D buffer to the P buffer, via process 610, as discussed above.

The system reads a block of data in at a 16X rate and stores it in the playback buffer, and also begins to play the block at the X rate for viewing. If the block continues to play until there are only 4 seconds left in the buffer, the changer will unload the database disk and load the specific disk, via process 611, containing the then selected data in its entirety. With the specific content disk loaded, the system begins to stream content to the D buffer, via process 612 and then to the P buffer, process 613, as discussed above. If, at this point, the user decides to go back to the menu, the menu may be loaded from flash memory, process 604, while at the same time the specific content disk may be unloaded from the drive, process 606, and the database disk is re-loaded into the drive, process 607. Since the data base disk can be ready in around 4 seconds, the user can select another entry for viewing and have a fairly instantaneous response once again.

If the database disk fills up, multiple database disks can be used with such an arrangement, recordings could be grouped by disk and as the user browses through the menu, the database disk for the particular menu 'branch' in the hierarchy could be loaded and all menu picks below that would apply to content located on the then loaded database disk. If desired, the read head could be moved to coincide with the menu being scrolled. Also, if desired, the read head could follow the scrolling, as shown in box 614. This then allows for the instantaneous beginning of content flow, once a user selection is made.

In the case where a recording session is going on wherein a record disk must be serviced on a regular basis, there will be a window of time during which the record disk is in the DVD reader and the database disk will not be available for instant replay. If the record buffer is depleted at 16X, then the system could keep the database disk in the DVD reader 16 times the amount of time that the recording disk is in the reader, minus the time required for loading and unloading the disk. This would minimize the probability of the user having to wait when making a selection from the menu. If the user does happen to make a selection while the recording disk is in or about to be accessed, then the wait time will be some part or all of the time required to service the recording disk with a 16X read and write times, this wait time would be no more than 5 seconds, including a 4 second disk change time. In such a situation, when the drive becomes available, the actual selected disk could be used instead of the database disk.

At a time when the bandwidth is available, the first portion (32 seconds in our example) of each new recording may be copied to a new location on the database disk. This database disk could also be used for other system features, keeping it in the DVD reader until the last minute when it has to be swapped out to sustain a selected operation. For example, in a video-on-demand application, a DVD+RW database disk could be used in place of a high-density disk (HDD) to buffer up content being streamed from the web. This disk could also be swapped in and out in a simultaneous record and play type operation if necessary, using the system and method discussed above.

Using these techniques, the DVD+RW drive and changer system could be made to emulate a very large HDD in a personal video recorder (PVR) system.

What is claimed is:

1. A method of providing a user with information quicker than could be achieved by obtaining the information from a storage source, said method comprising:
   receiving a request from a user for stored data accessible by said user, said stored data maintained on one or more disks accessible one at a time, said disks having a latency between a time of said request and a time said information is actually available;
   obtaining a first portion of data from a source location other than where said stored data resides, the amount of said first portion spanning said latency;
   buffering information coming from said one or more disks faster than said data is utilized, thereby creating disk idle periods;
   regardless of the request from a user, providing said first portion from a common disk containing a plurality of said first portions, each said first portion corresponding to a different possible user request;
   substituting the common disk for a disk of the one or more disks that contains requested data;
   said user scrolling through an index of possible applications contained in a fast access non-volatile memory; and
   positioning a read head at a location on a disk so as to be able to quickly read data at positioned locations, said positioning being controlled, in part, by said scrolling.

2. The method of claim 1 wherein said first portion is stored in a storage device in conjunction with other data having latency periods associated therewith, said storage device available continuously for obtaining data therefrom.

3. The method of claim 1 further including:
   storing in a buffer said first portion such that said buffer can supply said information to said user during the time of said substitution.

4. The method of claim 1, wherein said common disk comprises a plurality of disks, each having a data portion thereon.

5. A data retrieval system, said system comprising:
   a data storage library, said library holding a plurality of individually accessible storage media;
   a media drive operable for reading data from a selected one of said storage media contained in said library, said media drive having a latency between identity of desired data and a time said desired data is actually available;
   at least one buffer for accepting data from a storage media positioned in said media drive, said data accepted faster than it is utilized, thereby creating media drive idle periods;
   wherein said media drive is operable for delivering to a user at least one program during said idle periods;
   wherein a first portion of said at least one program comes from a storage media other than a storage media on which said at least one program resides; and
   at least one controller comprising logic to:
     receive a request from a user for stored data accessible by said user, said stored data maintained on one or more disks accessible one at a time, said disks having a latency between a time of said request and the time said stored data is actually available;
     obtain a first portion of data from a source location other than where said stored data resides, the amount of said first portion spanning said latency;
     buffer information coming from and going to said one or more disks;
     regardless of the request from a user, provide said first portion from a common disk containing a plurality of said first portions, each said first portion corresponding to a different possible user request;
     substitute the common disk a disk of the one or more disks that contains requested data;
     enable said user to scroll through an index of possible applications contained in a fast access non-volatile memory; and
     position a read head at a location on a disk so as to be able to quickly read data at positioned locations, said positioning being controlled, in part, by said scrolling.

6. The system of claim 5 wherein said individually accessible storage media share said media from drive alternately.

7. A system to provide a user with information quicker than could be achieved by obtaining the information from a storage source, comprising:
   at least one input to receive data from a high-volume data source;

at least one memory buffer module; and at least one controller comprising logic to:

receive a request from a user for stored data accessible by said user, said stored data maintained on one or more disks accessible one at a time, said one or more disks having a latency between a time of said request and a time said information is actually available;

obtain a first portion of data from a source location other than where said stored data resides, the amount of said first portion spanning said latency;

buffer information coming from and going to said one or more disks;

regardless of the request from a user, provide said first portion from a common disk containing a plurality of said first portions, each said first portion corresponding to a different possible user request;

substitute the common disk for a disk of the one or more disks that contains requested data;

enable said user to scroll through an index of possible applications contained in a fast access non-volatile memory; and position a read head at a location on a disk so as to be able to quickly read data at positioned locations, said positioning being controlled, in part, by said scrolling.

8. The system of claim 7 wherein said first portion is stored in a storage device in conjunction with other data having latency periods associated therewith, said storage device available continuously for obtaining data therefrom.

9. The system of claim 7 wherein the at least one controller further comprises logic to store in a buffer said first portion such that said buffer can supply said information to said user during the time of said substitution.

10. The system of claim 7 wherein said common disk comprises a plurality of disks, each having a data portion thereon.

* * * * *